(12) United States Patent
Peng et al.

(10) Patent No.: US 7,695,708 B2
(45) Date of Patent: Apr. 13, 2010

(54) CATALYTIC STEAM REFORMING WITH RECYCLE

(75) Inventors: Xiang-Dong Peng, Orefield, PA (US); James Richard O'Leary, Allentown, PA (US); Blaine Edward Herb, New Tripoli, PA (US); Krishnakumar Jambunathan, Macungie, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 404 days.

(21) Appl. No.: 11/691,039

(22) Filed: Mar. 26, 2007

(65) Prior Publication Data

US 2008/0241059 A1 Oct. 2, 2008

(51) Int. Cl.
*C01B 3/26* (2006.01)
(52) U.S. Cl. .................................. 423/652; 252/373
(58) Field of Classification Search ................ 423/650, 423/651, 652, 653, 654; 252/373
See application file for complete search history.

(56) References Cited

U.S. PATENT DOCUMENTS

| 3,297,408 | A | | 1/1967 | Marshall, Jr. | |
|---|---|---|---|---|---|
| 3,655,448 | A | | 4/1972 | Setzer | |
| 5,023,276 | A | | 6/1991 | Yarrington et al. | |
| 5,068,058 | A | | 11/1991 | Bushinsky et al. | |
| 6,086,840 | A | * | 7/2000 | Whitney et al. | 423/359 |
| 6,114,400 | A | | 9/2000 | Nataraj et al. | |
| 6,348,278 | B1 | | 2/2002 | Lapierre et al. | |
| 6,521,143 | B1 | * | 2/2003 | Genkin et al. | 252/373 |
| 6,525,104 | B2 | | 2/2003 | Abbott | |
| 6,726,852 | B2 | * | 4/2004 | Iijima et al. | 252/373 |
| 6,783,750 | B2 | * | 8/2004 | Shah et al. | 423/652 |
| 6,818,198 | B2 | | 11/2004 | Singh et al. | |
| 6,821,501 | B2 | * | 11/2004 | Matzakos et al. | 423/652 |
| 7,037,485 | B1 | | 5/2006 | Drnevich et al. | |
| 7,438,889 | B2 | * | 10/2008 | Pez et al. | 423/652 |
| 2001/0027220 | A1 | | 10/2001 | Kennedy | |
| 2003/0039608 | A1 | * | 2/2003 | Shah et al. | 423/650 |
| 2003/0068269 | A1 | * | 4/2003 | Matzakos et al. | 423/652 |
| 2004/0018144 | A1 | * | 1/2004 | Briscoe | 423/652 |
| 2004/0182002 | A1 | * | 9/2004 | Malhotra et al. | 48/198.7 |
| 2005/0118089 | A1 | * | 6/2005 | Abbott et al. | 423/418.2 |
| 2005/0196659 | A1 | | 9/2005 | Grieve et al. | |
| 2005/0245619 | A1 | | 11/2005 | Fenouil et al. | |
| 2005/0288381 | A1 | | 12/2005 | Marrella et al. | |
| 2006/0057060 | A1 | * | 3/2006 | Sun et al. | 423/651 |
| 2006/0216228 | A1 | * | 9/2006 | Woods et al. | 423/652 |
| 2006/0260194 | A1 | | 11/2006 | Tio | |
| 2007/0098627 | A1 | * | 5/2007 | Marshall et al. | 423/650 |
| 2007/0172419 | A1 | * | 7/2007 | Peng et al. | 423/651 |
| 2007/0292342 | A1 | * | 12/2007 | Hemmings et al. | 423/651 |

FOREIGN PATENT DOCUMENTS

AU 40748 64 A 8/1965

(Continued)

*Primary Examiner*—Wayne Langel
(74) *Attorney, Agent, or Firm*—Bryan C. Hoke, Jr.

(57) ABSTRACT

A method for generating hydrogen in a production facility having a catalytic steam reformer, a boiler downstream of the catalytic steam reformer, optionally having a prereformer, and optionally having a shift reactor, wherein the reformer feed gas mixture is formed using a steam-containing recycle gas mixture which was formed from boiler effluent. The boiler generates steam which may be used to form the reformer feed gas mixture, used elsewhere in the production facility, and/or used for export steam.

24 Claims, 1 Drawing Sheet

FOREIGN PATENT DOCUMENTS

| | | |
|---|---|---|
| EP | 0 640 560 A | 3/1995 |
| EP | 1002779 A1 | 5/2000 |
| GB | 1129326 | 10/1968 |
| GB | 1 460 187 A | 12/1976 |
| GB | 2 006 814 A | 5/1979 |
| WO | 00/39875 A | 7/2000 |
| WO | 0160773 A1 | 8/2001 |
| WO | 03104355 A1 | 12/2003 |
| WO | 2005000736 A1 | 1/2005 |
| WO | 2006082332 A1 | 10/2006 |

* cited by examiner

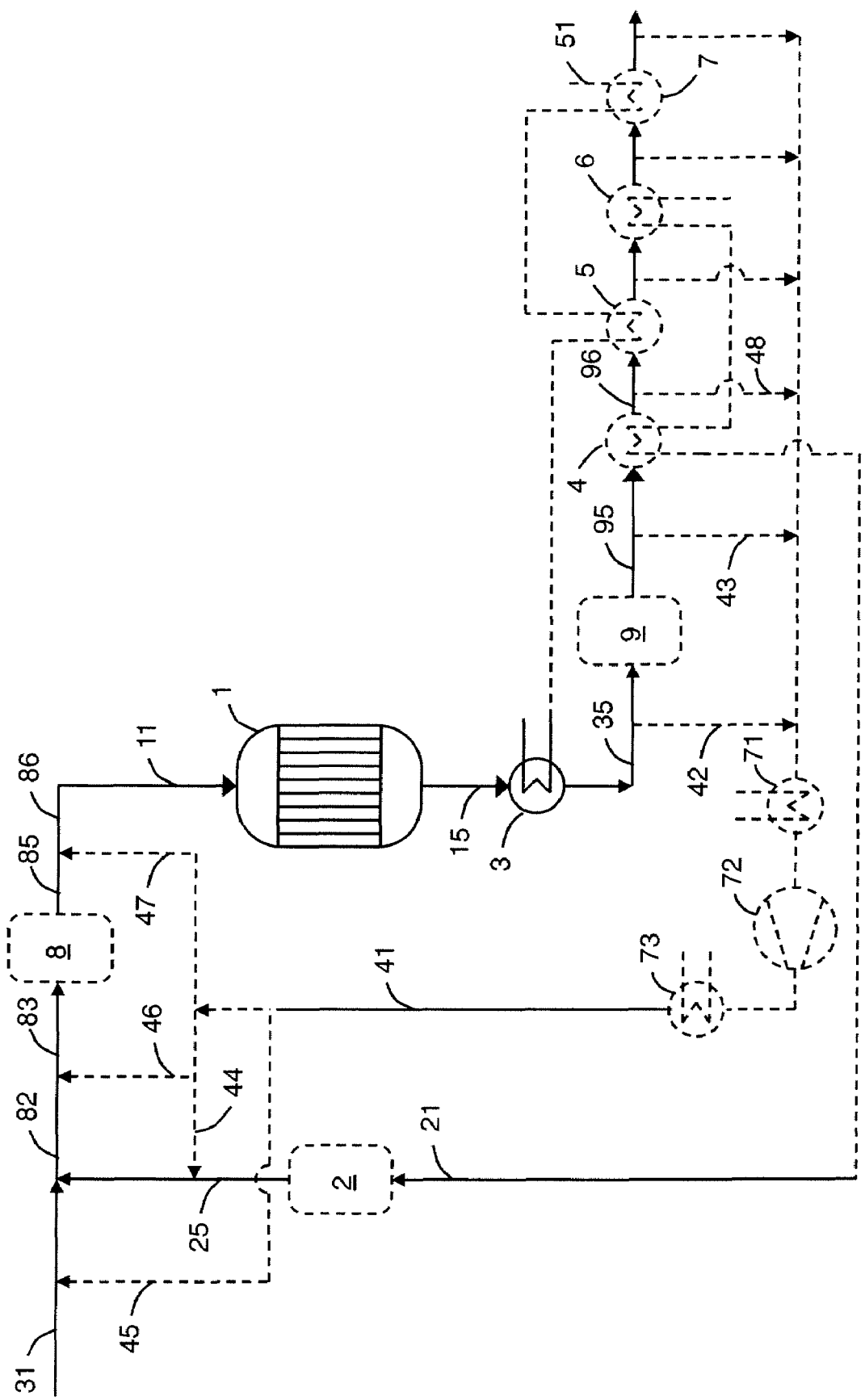

CATALYTIC STEAM REFORMING WITH RECYCLE

BACKGROUND

The present invention is directed to a method for generating hydrogen in a catalytic steam reformer.

In a conventional catalytic steam reforming process, a reformer feedstock is introduced into a desulfurization unit to remove sulfur and form a sulfur-depleted reformer feedstock. Sulfur in the reformer feedstock is removed to prevent poisoning of reforming catalyst. Additionally, in a hydrodesulfurization unit, at least a portion of the unsaturated hydrocarbons in the reformer feedstock are converted to saturated hydrocarbons.

The sulfur-depleted reformer feedstock is combined with a steam-containing gas (e.g. process steam) to form a sulfur-depleted feedstock mixture (mixed feed). Optionally, the sulfur-depleted feedstock mixture may be heated and then prereformed in a prereformer where a portion of the hydrocarbon is reformed by steam to form hydrogen and carbon monoxide.

The sulfur-depleted feedstock mixture or the effluent from the prereformer is introduced into a catalytic steam reformer as a reformer feed gas mixture. The reformer feed gas mixture may be optionally heated prior to being introduced into the catalytic steam reformer. In the catalytic steam reformer, hydrocarbon is reformed by steam over a reforming catalyst to form a reformed gas mixture. The reformed gas mixture generally comprises hydrogen, carbon monoxide, carbon dioxide, and unconverted hydrocarbon and steam.

Catalytic steam reformers have numerous reactor tubes containing steam reforming catalyst, called reformer tubes, generally arranged parallel to each other in the reformer. The reformer is a type of furnace where a fuel is combusted external to the reformer tubes to provide heat for the reforming reactions. Fuel and oxidant, typically air, is introduced through burners generating heat energy that is transferred to the reformer tubes by radiation and convection.

The reformer feed gas mixture is introduced into the reformer tubes where reforming reactions take place to form a reformed gas mixture. The reformed gas mixture from the reformer tubes is collected in a common header manifold. The reformed gas mixture is removed as effluent from the reformer. The reformed gas mixture is generally referred to as synthesis gas or syngas. The reformed gas mixture may be further processed in a shift reactor and/or separated in a hydrogen pressure swing adsorption system to form a hydrogen-containing product stream. Alternatively, the reformed gas mixture as syngas may be used for synthesizing other chemicals, for example methanol.

A large portion of the heat contained in this reformed gas mixture is recovered in a heat exchanger, referred to as a waste heat boiler to produce steam. The steam generated in the waste heat boiler may be used to form the steam-containing gas used for the reforming reaction and/or may be exported to another nearby process.

In addition to providing hydrogen to refineries, hydrogen production facilities are often required to provide a minimum amount of export steam under contract. Export steam is steam produced by the hydrogen production facility that is exported to another process.

There are occasions when the hydrogen production rate is decreased below the design capacity (i.e. turndown). The hydrogen production rate may be decreased due to normal variation in hydrogen demand. The hydrogen production rate may be decreased due to lack of demand at a refinery. The hydrogen production rate may be decreased due to lack of hydrogen pipeline demand.

A problem that occurs during hydrogen production turndown is that the amount of steam produced by the hydrogen production facility is also decreased. Part of this steam production decrease is due to the reduction of effluent available from the reformer and the associated heat from the effluent for the waste heat boiler. The amount of steam produced is directly coupled to the amount of hydrogen produced. This may lead to a situation where the demand on export steam cannot be met due to low hydrogen production.

It would be desirable to efficiently produce steam in a hydrogen production facility at various hydrogen production rates, particularly during turndown conditions.

BRIEF SUMMARY

The present invention relates to a method for generating hydrogen in a production facility. More specifically, the present invention relates to a method for generating hydrogen using a catalytic steam reformer.

The method comprises (a) forming a reformer feed gas mixture from a steam-containing gas, a sulfur-depleted reformer feedstock, and a separate steam-containing recycle gas mixture, (b) introducing the reformer feed gas mixture into a plurality of catalyst-containing reformer tubes of a catalytic steam reformer to form a reformed gas mixture comprising hydrogen, (c) combusting a fuel external to the plurality of catalyst-containing reformer tubes to supply energy for reforming the reformer feed gas mixture, (d) passing the reformed gas mixture or a portion of the reformed gas mixture from the plurality of catalyst-containing reformer tubes into a boiler to form a boiler effluent from the reformed gas mixture or the portion of the reformed gas mixture and to generate steam from a liquid water-containing feed, and (e) forming the separate steam-containing recycle gas mixture from a portion of the boiler effluent.

The step of forming the separate steam-containing recycle gas mixture may comprise cooling the first portion of the boiler effluent to form a cooled portion of the boiler effluent, and compressing the cooled portion of the boiler effluent to form a compressed portion of the boiler effluent for forming the separate steam-containing recycle gas mixture. The step of forming the separate steam-containing recycle gas mixture may further comprise heating the compressed portion of the boiler effluent.

The method may further comprise passing a second portion of the boiler effluent into at least one heat exchanger to heat at least one of a reformer feedstock and the liquid water-containing feed. The method may further comprise passing the reformer feedstock into a desulfurization unit to form the sulfur-depleted reformer feedstock from the reformer feedstock.

The step of forming the reformer feed gas mixture may comprise forming a first gas mixture from the separate steam-containing recycle gas mixture and the sulfur-depleted reformer feedstock, and combining the first gas mixture with the steam-containing gas. The separate steam-containing recycle gas mixture and the sulfur-depleted reformer feedstock may be combined in a compressor ejector to form the first gas mixture.

The step of forming the reformer feed gas mixture may comprise forming a steam-enriched recycle gas mixture from the separate steam-containing recycle gas mixture and the steam-containing gas, and combining the steam-enriched recycle gas mixture with the sulfur-depleted reformer feedstock. The separate steam-containing recycle gas mixture and the steam containing gas may be combined in a compressor ejector to form the steam-enriched recycle gas mixture.

The step of forming the reformer feed gas mixture may comprise forming a sulfur-depleted feedstock mixture from the sulfur-depleted reformer feedstock and the steam-containing gas, and combining the sulfur-depleted feedstock mixture with the separate steam-containing recycle gas mixture. The sulfur-depleted feedstock mixture and the separate steam-containing recycle gas mixture may be combined in a compressor ejector.

The step of forming the reformer feed gas mixture may comprise forming a sulfur-depleted feedstock mixture from the sulfur-depleted reformer feedstock and the steam-containing gas, introducing the sulfur-depleted feedstock mixture into a prereformer to form a prereformed gas mixture, and combining the prereformed gas mixture with the separate steam-containing recycle gas mixture. The prereformed gas mixture and the separate steam-containing recycle gas mixture may be combined in a compressor ejector.

The step of forming the reformer feed gas mixture may comprise forming a first gas mixture from the separate steam-containing recycle gas mixture and the sulfur-depleted reformer feedstock, combining the first gas mixture with the steam-containing gas to form a sulfur-depleted feedstock mixture containing recycle gas, and introducing the sulfur-depleted feedstock mixture containing recycle gas into a prereformer to prereform the sulfur-depleted feedstock mixture containing recycle gas for forming the reformer feed gas mixture. The separate steam-containing recycle gas mixture and the sulfur-depleted reformer feedstock may be combined in a compressor ejector to form the first gas mixture.

The step of forming the reformer feed gas mixture may comprise forming a steam-enriched recycle gas mixture from the separate steam-containing recycle gas mixture and the steam-containing gas, combining the steam-enriched recycle gas mixture with the sulfur-depleted reformer feedstock to form a sulfur-depleted feedstock mixture containing recycle gas, and introducing the sulfur-depleted feedstock mixture containing recycle gas into a prereformer to prereform the sulfur-depleted feedstock mixture containing recycle gas for forming the reformer feed gas mixture. The separate steam-containing recycle gas mixture and the steam-containing gas may be combined in a compressor ejector to form the steam-enriched recycle gas mixture.

The step of forming the reformer feed gas mixture may comprise forming a sulfur-depleted feedstock mixture from the sulfur-depleted reformer feedstock and the steam-containing gas, combining the sulfur-depleted feedstock mixture with the separate steam-containing recycle gas mixture to form a sulfur-depleted feedstock mixture containing recycle gas, and introducing the sulfur-depleted feedstock mixture containing recycle gas into a prereformer to prereform the sulfur-depleted feedstock mixture containing recycle gas for forming the reformer feed gas mixture.

The step of forming the separate steam-containing recycle gas mixture may comprise passing the boiler effluent into at least one heat exchanger to form a heat exchanger effluent, heating at least one of a reformer feedstock and the liquid water-containing feed, and taking a portion of the heat exchanger effluent for forming the separate steam-containing recycle gas mixture. The step of forming the separate steam-containing recycle gas mixture may further comprise cooling the portion of the heat exchanger effluent to form a cooled portion of the heat exchanger effluent, and compressing the cooled portion of the heat exchanger effluent to form a compressed portion of the heat exchanger effluent for forming the separate steam-containing recycle gas mixture. The step of forming the separate steam-containing recycle gas mixture may further comprise heating the compressed portion of the heat exchanger effluent for forming the separate steam-containing recycle gas mixture.

The step of forming the separate steam-containing recycle gas mixture may comprise passing the boiler effluent into a shift reactor to form a shift reactor effluent, and taking a first portion of the shift reactor effluent for forming the separate steam-containing recycle gas mixture. The step of forming the separate steam-containing recycle gas mixture may further comprise cooling the first portion of the shift reactor effluent to form a cooled portion of the shift reactor effluent, and compressing the cooled portion of the shift reactor effluent to form a compressed portion of the shift reactor effluent for forming the separate steam-containing recycle gas mixture. The step of forming the separate steam-containing recycle gas mixture may further comprise heating the compressed portion of the shift reactor effluent for forming the separate steam-containing recycle gas mixture. The method may further comprise passing a second portion of the shift reactor effluent into at least one heat exchanger to heat at least one of a reformer feedstock and the liquid water-containing feed. The method may further comprise passing the reformer feedstock into a desulfurization unit to form the sulfur-depleted reformer feedstock from the reformer feedstock.

BRIEF DESCRIPTION OF SEVERAL VIEWS OF THE DRAWINGS

The FIGURE is a schematic of a production facility suitable for executing the disclosed method for generating hydrogen.

DETAILED DESCRIPTION

The indefinite articles "a" and "an" as used herein mean one or more when applied to any feature in embodiments of the present invention described in the specification and claims. The use of "a" and "an" does not limit the meaning to a single feature unless such a limit is specifically stated. The definite article "the" preceding singular or plural nouns or noun phrases denotes a particular specified feature or particular specified features and may have a singular or plural connotation depending upon the context in which it is used. The adjective "any" means one, some, or all indiscriminately of whatever quantity.

For the purposes of simplicity and clarity, detailed descriptions of well-known devices, circuits, and methods are omitted so as not to obscure the description with unnecessary detail.

The present invention relates to a method for generating hydrogen in a production facility.

The method comprises forming a reformer feed gas mixture from a steam-containing gas, a sulfur-depleted reformer feedstock, and a separate steam-containing recycle gas mixture. As shown in the FIGURE, a steam-containing gas 31 is combined with a sulfur-depleted reformer feedstock 25, and a separate steam-containing recycle gas mixture 41 to form the reformer feed gas mixture 11. The steam-containing gas 31, the sulfur-depleted reformer feedstock 25, and the separate steam-containing recycle gas mixture 41 may be combined in any order and may include prereforming in a prereformer 8 as described further below.

Forming may include a combination of various steps, for example, mixing, reacting, heating, cooling, compressing, expanding, throttling, separating, etc. A mixture is formed from a first gas and a second gas if the mixture comprises one or more elemental constituents from the first gas and one or more elemental constituents from the second gas. For example, a mixture comprising elemental carbon and/or elemental hydrogen from a methane-containing first gas and elemental hydrogen and/or elemental oxygen from a water-containing second gas is formed from the methane-containing first gas and the water-containing second gas. The mixture may comprise the element carbon and element hydrogen as methane from the methane-containing first gas and the element hydrogen and the element oxygen as water from the water-containing second gas. Or the methane-containing first gas and the water-containing second gas may be reacted so that the mixture comprises the element carbon from the methane-containing first gas and element oxygen from the water-containing second gas as carbon dioxide.

A first mixture is formed from a second mixture if the first mixture comprises one or more elemental constituents from the second mixture. For example, a first mixture comprising elemental carbon, elemental hydrogen, and elemental oxygen as carbon dioxide and hydrogen may be formed from via a shift reaction of a second mixture comprising elemental carbon, elemental hydrogen and elemental oxygen as carbon monoxide and water.

The steam-containing gas may comprise greater than 99 volume % steam.

A reformer feed gas mixture is any mixture of molecular species suitable for introducing into a reformer to generate hydrogen. A reformer feed gas mixture may comprise methane and steam.

A sulfur-depleted reformer feedstock is any reformer feedstock wherein at least a portion of the reformer feedstock has passed through a desulfurization unit. The sulfur-depleted reformer feedstock may comprise less than 20 ppm sulfur, or less than 10 ppm sulfur, or less than 1 ppm sulfur, or less than 50 ppb on a volume basis and may comprise less than 1 volume % steam. Reformer feedstock may be natural gas, naphtha, propane, refinery offgas, or other suitable feedstock for forming hydrogen and/or carbon monoxide in a reformer. A desulfurization unit is any known device for removing at least a portion of the sulfur in the reformer feedstock, for example, a hydrodesulfurization unit which is well-known in the petroleum refinery industry. The FIGURE shows reformer feedstock 21 passed to desulfurization unit 2 to form sulfur-depleted reformer feedstock 25.

A steam-containing recycle gas mixture is defined as any gas mixture containing steam from reformer effluent that has been recovered for recycling to the reformer. The steam-containing recycle gas mixture may comprise greater than 10 volume % steam or may comprise between 25 volume % and 95 volume % steam.

A "separate" steam-containing recycle gas mixture means that this steam-containing recycle gas mixture is not used to form either of the steam-containing gas or the sulfur-depleted reformer feedstock.

The method comprises introducing the reformer feed gas mixture into a plurality of catalyst-containing reformer tubes of a catalytic steam reformer to form a reformed gas mixture comprising hydrogen. As shown in the FIGURE, reformer feed gas mixture 11 is introduced into reformer 1 to form reformed gas mixture 15.

Catalytic steam reforming, also called steam methane reforming (SMR) or steam reforming, is defined as any process used to convert reformer feedstock to synthesis gas by reaction with steam over a catalyst. Synthesis gas, commonly called syngas, is a mixture comprising hydrogen and carbon monoxide.

A catalytic steam reformer, also called a steam methane reformer, is defined herein as any fired furnace used to convert feedstock containing elemental hydrogen and carbon to synthesis gas by a reaction with steam over a catalyst with heat provided by combustion of a fuel. Feedstock may be natural gas, methane, naphtha, propane, refinery offgas, or other suitable reformer feedstock. A catalytic steam reformer may have a plurality of catalyst-containing reformer tubes through which the reformer feed gas mixture is passed to form a reformed gas mixture comprising hydrogen. As used herein, plurality means at least two. Catalyst-containing reformer tubes have been loaded with catalyst in the form of pellets, structured packing, or other catalyst-containing packing known in the art. Suitable catalysts for reforming reformer feedstock are known in the art. Suitable materials for making reformer tubes are known in the art. Suitable operating temperatures and pressures for a catalytic steam reformer are known in the art.

The steam-to-carbon ratio of the reformer feed gas mixture is a parameter that is generally maintained within a specified range. Steam is more than just a reactant in the reformer. A steam-to-carbon ratio that is too low may lead to carbon formation on the reformer catalyst and thereby degrade the activity of the reformer catalyst. If there is a downstream shift reactor, a steam-to-carbon ratio that is too low may lead to over-reduction of iron-based shift catalyst, which degrades the activity of the shift catalyst. It is generally desirable to keep the steam-to-carbon ratio as low as possible without carbon formation in the reformer and over-reduction of the shift catalyst because the energy efficiency of the overall process degrades when the steam-to-carbon ratio increases.

The method comprises combusting a fuel external to the plurality of catalyst-containing reformer tubes to supply energy for reforming the reformer feed gas mixture. The overall reaction for reforming the feed gas mixture to form the reformed gas mixture is an endothermic process. As discussed above, a reformer is a fired furnace, meaning that it includes combustion firing. A combustion system (not shown) is used to combust a fuel to provide energy for the endothermic process. Combustion systems, including suitable burners, are known in the art. Products of combustion, also called flue gases (not shown) are removed from the reformer and may pass through various heat recovery devices (not shown) as known in the art.

The method comprises passing the reformed gas mixture or a portion of the reformed gas mixture from the plurality of catalyst-containing reformer tubes into a boiler to form a boiler effluent from the reformed gas mixture or the portion of the reformed gas mixture. Referring to the FIGURE, the entire reformed gas mixture 15 is passed to the boiler 3 thereby forming boiler effluent 35. Alternatively a portion of the reformed gas mixture 15 may be passed to the boiler 3 to form boiler effluent 35.

A boiler is defined as a vessel that generates steam. Boiler 3 may generate process steam that is used to form a portion of steam-containing gas 31 or used for other steam needs in the hydrogen production facility or export steam. Boiler 3 is typically called a waste heat boiler.

The method comprises forming the separate steam-containing recycle gas mixture from a first portion of the boiler effluent. The separate steam-containing recycle gas mixture may be formed from the portion of the boiler effluent in a number of different ways described below.

A second portion of the boiler effluent may be removed from the system as a product stream containing hydrogen. This second portion of the boiler effluent may be passed to low level heat recovery devices, further processed and/or purified as desired. As shown in the FIGURE, the product stream is passed to optional heat exchanger 4, subsequently passed to optional heat exchanger 5 for further cooling, subsequently passed to optional heat exchanger 6 for further cooling, and subsequently passed to optional heat exchanger 7 for further cooling. Heat exchanger 4 and heat exchanger 6 are shown to preheat reformer feedstock 21, which is subsequently passed into a desulfurization unit 2 to form sulfur-depleted reformer feedstock from reformer feedstock. Heat exchanger 5 and heat exchanger 7 are shown to heat liquid water-containing feed 51. Liquid water-containing feed 51, often called boiler feed water, is a significant heat sink, providing significant heat recovery from the product stream containing hydrogen for the production facility. After liquid water-containing feed is heated in heat exchanger 5, the heated liquid water-containing feed, or a portion of it, is passed to boiler 3, optionally via a steam drum (not shown), where it is converted to steam. The steam that is generated in boiler 3 may be used to form the reformer feed gas mixture and/or used elsewhere in the production facility and/or exported.

As shown in the FIGURE, the second portion of the boiler effluent may first pass in indirect heat transfer communication with the reformer feedstock 21 in heat exchanger 4 and subsequently passed in indirect heat transfer communication with the liquid water-containing feed 51 in heat exchanger 5. Alternatively, the second portion of the boiler effluent may first pass in indirect heat transfer communication with the liquid water-containing feed 51 in heat exchanger 5 and subsequently passed in indirect heat transfer communication with reformer feedstock 21 in heat exchanger 4. In another alternative, a single heat exchanger (not shown) may be used to heat the reformer feedstock 21 and the liquid water-containing feed 51.

Heat exchanger 4 and heat exchanger 6 may be any known heat exchangers suitable for providing heat transfer communication between the product stream and the reformer feedstock 21. Heat exchanger 5 and heat exchanger 7 may be any known heat exchangers suitable for providing heat transfer communication between the product stream and the liquid water-containing feed 51. The combined heat exchanger for heating both the reformer feedstock and the liquid water-containing feed 51 may be any known heat exchanger suitable for providing heat transfer communication between the product stream and both of the reformer feedstock 21 and the liquid water-containing feed 51. The heat exchangers may be conventional shell and tube heat exchangers, which are well known in the art. Suitable materials of construction are known.

In addition to or alternatively to passing the product stream in indirect heat transfer communication with the reformer feedstock and the liquid water-containing feed, the product stream may pass in indirect heat transfer communication with other process streams. Other heat exchangers may be used to heat other process streams as desired. Other process streams may include, for example, combustion air, pressure swing adsorption purge gas used as a fuel, natural gas, refinery fuel gas, water for a deaerator, and/or monoethanolamine (MEA) solvent for carbon dioxide removal system.

As shown in the FIGURE, the heated reformer feedstock is passed to a desulfurization unit to form sulfur-depleted reformer feedstock from reformer feedstock.

The separate steam-containing recycle gas mixture may be formed directly from boiler effluent. Referring to the FIGURE, a first portion of boiler effluent 35 is optionally removed as stream 42 to form the separate steam-containing recycle gas mixture 41. Optionally, specific components, for example hydrogen and carbon dioxide, may be separated and removed in a separation device (not shown) as part of forming separate steam-containing recycle gas mixture 41. Optionally, the method may further comprise cooling the first portion of the boiler effluent to form a cooled portion of the boiler effluent and compressing the cooled portion of the boiler effluent for forming the separate steam-containing recycle gas mixture. In this option, stream 42 may be cooled in optional heat exchanger 71, compressed in optional compressor 72, and heated in optional heat exchanger 73. Alternatively, stream 42 may be cooled by direct heat exchange where liquid water is injected into the stream.

Separate steam-containing recycle gas mixture 41 may be formed while retaining substantially all of the water (steam) contained in the first portion of boiler effluent. When separate steam-containing recycle gas mixture is formed while retaining substantially all of the water contained in the first portion of the boiler effluent, the water concentration of the separate steam-containing recycle gas mixture is equal to or greater than the water concentration of the first portion of the boiler effluent.

Separate steam-containing recycle gas mixture 41 may be formed while condensing a portion of the water (steam) contained in the first portion of the boiler effluent. The separate steam-containing recycle gas mixture may carry along liquid water in two phase flow for recycling.

The step of forming the separate steam-containing recycle gas mixture may optionally comprise passing the boiler effluent into a shift reactor to form a shift reactor effluent and taking a first portion of the shift reactor effluent for forming the separate steam-containing recycle gas mixture. A second portion of the shift reactor effluent may be removed from the system as a product stream containing hydrogen. This second portion of the shift reactor effluent may be passed to at least one heat exchanger for heating reformer feedstock and/or liquid water-containing feed, further processed and/or purified as desired. As shown in the FIGURE, the second portion of the shift reactor effluent is passed to optional heat exchanger 4, optional heat exchanger 5, optional heat exchanger 6, and optional heat exchanger 7 for further cooling. Descriptions and options for the heat exchangers are as described above for boiler effluent.

Referring to the FIGURE, boiler effluent 35 is passed to optional shift reactor 9 to form shift reactor effluent 95 and a first portion of the shift reactor effluent 95 removed as stream 43 to form the separate steam-containing recycle gas mixture 41.

When a portion of the shift reactor effluent is removed as stream 43, separate steam-containing recycle gas mixture 41 is formed from a portion of the boiler effluent since separate steam-containing recycle gas mixture 41 comprises one or more elemental constituents from boiler effluent 35. Optionally, specific components, for example hydrogen and carbon dioxide, may be separated and removed in a separation device (not shown) as part of forming separate steam-containing recycle gas mixture 41. The separation device may be, for example, membranes permeable to hydrogen and/or carbon dioxide, and/or pressure swing adsorption separation using an adsorbent selective to hydrogen and/or carbon dioxide.

Separate steam-containing recycle gas mixture 41 may be formed while retaining substantially all of the water (steam) contained in the first portion of shift reactor effluent. When separate steam-containing recycle gas mixture is formed while retaining substantially all of the water contained in the first portion of the shift reactor effluent, the water concentration of the separate steam-containing recycle gas mixture is equal to or greater than the water concentration of the first portion of the shift reactor effluent. Separate steam-containing recycle gas mixture 41 may be formed while condensing a portion of the water (steam) contained in the first portion of the shift reactor effluent. The separate steam-containing recycle gas mixture may carry along liquid water in two phase flow for recycling.

A shift reactor is defined as any device where carbon monoxide reacts with water to form hydrogen and carbon dioxide in the presence of a catalyst. Any suitable shift reactor may be used and may be selected without undue experimentation. Shift reactors are well known in the art.

The step of forming the separate steam-containing recycle gas mixture may further comprise cooling the first portion of the shift reactor effluent to form a cooled portion of the shift reactor effluent and compressing the cooled portion of the shift reactor effluent for forming the separate steam-containing recycle gas mixture. Referring to the FIGURE, shift reactor effluent 95 may be cooled in a heat exchanger (not shown) before taking stream 43 or stream 43 may be removed and cooled in optional heat exchanger 71 prior to forming separate steam-containing recycle gas mixture 41. The cooled portion of the shift reactor effluent may be compressed in optional compressor 72 to increase the pressure and optionally heated in optional heat exchanger 73 for forming separate steam-containing recycle gas mixture 41. Alternatively, stream 42 or stream 43 may be cooled by direct heat exchange where liquid water is injected into the stream. A second portion of the shift reactor effluent may be passed into at least one heat exchanger to heat at least one of a reformer feedstock and the liquid water-containing feed, further processed and/or purified as desired. The reformer feedstock may be passed into a desulfurization unit to form the sulfur-depleted reformer feedstock from the reformer feedstock. As shown in, the second portion of the shift reactor effluent is passed to optional heat exchanger 4 to heat the reformer feedstock which is then passed to the desulfurization unit 2. The second portion of the shift reactor effluent is also shown to pass to optional heat exchanger 5, optional heat exchanger 6, and optional heat exchanger 7 for further cooling. Descriptions and options for the heat exchangers are as described above for boiler effluent.

The step of forming the separate steam-containing recycle gas mixture may comprise passing the boiler effluent into at least one heat exchanger to form a heat exchanger effluent and to heat at least one of a reformer feedstock and the liquid water containing feed, and taking a portion of the heat exchanger effluent for forming the separate steam-containing recycle gas mixture. Referring to the FIGURE, boiler effluent 35 is passed to optional heat exchanger 4 to form a heat exchanger effluent 96. A portion of heat exchanger effluent 96 is taken as stream 48 to form separate steam-containing recycle gas mixture 41. A portion of a heat exchanger effluent may be taken from any of the downstream heat exchangers, for example heat exchanger 5, heat exchanger 6, and/or heat exchanger 7. The portion of the heat exchanger effluent may be cooled in optional heat exchanger 71, compressed in optional compressor 72, and heated in optional heat exchanger 73, if desired. Alternatively, the portion of the heat exchanger effluent may be cooled by direct heat exchange where liquid water is injected into the stream.

The step of forming the separate steam-containing recycle gas mixture may comprise passing the boiler effluent into a shift reactor to form a shift reactor effluent, passing at least a portion of the shift reactor effluent into at least one heat exchanger to form a heat exchanger effluent and to heat at least one of a reformer feedstock and the liquid water-containing feed, and taking a portion of the heat exchanger effluent for forming the separate steam-containing recycle gas mixture. Referring to the FIGURE, boiler effluent 35 is passed to optional shift reactor 9 to form shift reactor effluent 95. Shift reactor effluent 95 is passed to heat exchanger 4 to form a heat exchanger effluent 96 and to heat the reformer feedstock 21. The reformer feedstock 21 is shown to pass into desulfurization unit 2 to form the sulfur-depleted reformer feedstock 25 from the reformer feedstock 21. A portion of heat exchanger effluent 96 is removed as stream 48 for forming the separate steam-containing recycle gas mixture 41. A second portion of heat exchanger effluent 96 is passed to optional heat exchangers 5, 6 and 7. Heat exchanger effluent may be taken from any of the optional heat exchangers as shown in the FIGURE. The portion of the heat exchanger effluent may be cooled in optional heat exchanger 71, compressed in optional compressor 72, and heated in optional heat exchanger 73, if desired. Alternatively, the portion of the heat exchanger effluent may be cooled by direct heat exchange where liquid water is injected into the stream.

As stated above, the steam-containing gas, the sulfur-depleted reformer feedstock, and the separate steam-containing recycle gas mixture may be combined in any order and may include prereforming in a prereformer.

The step of forming the reformer feed gas mixture may comprise forming a first gas mixture from the separate steam-containing recycle gas mixture and the sulfur-depleted reformer feedstock and combining the first gas mixture with the steam-containing gas. Referring to the FIGURE, separate steam-containing recycle gas mixture 41 is combined as stream 44 with sulfur-depleted reformer feedstock 25 to form the first gas mixture and the first gas mixture then combined with the steam-containing gas 31 to form the reformer feed gas mixture 11. The separate steam-containing recycle gas mixture and the sulfur-depleted reformer feedstock may be combined in a compressor ejector, also called a jet eductor, (not shown) to provide a first gas mixture having suitable pressure for combining with the steam-containing gas. Compressor ejectors are known in the art and a suitable compressor ejector may be selected without undue experimentation. Use of a compressor ejector in a system for recycling autothermal reformer effluent is disclosed in U.S. Pat. No. 6,818, 198.

The step of forming the reformer feed gas mixture may comprise forming a steam-enriched recycle gas mixture from the separate steam-containing recycle gas mixture and the steam containing gas and combining the steam-enriched recycle gas mixture with the sulfur-depleted reformer feedstock. As shown in the FIGURE, separate steam-containing recycle gas mixture 41 is combined as stream 45 with steam-containing gas 31 to form the steam-enriched recycle gas mixture and the steam-enriched recycle gas mixture then combined with the sulfur-depleted reformer feedstock 25 to form the reformer feed gas mixture 11. The separate steam-containing recycle gas mixture and the steam-containing gas 31 may be combined in a compressor ejector (not shown).

The step of forming the reformer feed gas mixture may comprise forming a sulfur-depleted feedstock mixture from the sulfur-depleted reformer feedstock and the steam-containing gas and combining the sulfur-depleted feedstock mixture with the separate steam-containing recycle gas mixture. Referring to the FIGURE, sulfur-depleted reformer feedstock 25 is combined with steam-containing gas 31 to form the sulfur-depleted feedstock mixture 82 and then sulfur-depleted feedstock mixture 82 is combined with separate steam-containing recycle gas mixture 41 as stream 46 to form the reformer feed gas mixture 11. The separate stream-containing recycle gas mixture and the sulfur-depleted feedstock mixture may be combined in a compressor ejector (not shown).

The step of forming the reformer feed gas mixture may comprise forming a sulfur-depleted feedstock mixture from the sulfur-depleted reformer feedstock and the steam-containing gas, introducing the sulfur-depleted feedstock mixture into a prereformer to form a prereformed gas mixture, and combining the prereformed gas mixture with the separate steam-containing recycle gas mixture. Referring to the FIGURE, sulfur-depleted reformer feedstock 25 is combined with steam-containing gas 31 to form the sulfur-depleted feedstock mixture 82. Sulfur-depleted feedstock mixture 82 is introduced into optional prereformer 8 to form prereformed gas mixture 85. Prereformed gas mixture 85 is combined with separate steam-containing recycle gas mixture as stream 47 to form reformer feed gas mixture 11. The separate steam-containing recycle gas mixture and the sulfur-depleted feedstock mixture may be combined in a compressor ejector (not shown).

A prereformer is defined herein as any unfired vessel used to convert feedstock containing elemental hydrogen and elemental carbon to synthesis gas by reaction with steam over a catalyst with or without heating. A prereformer may be an adiabatic fixed bed reactor. A prereformer may be a tubular reactor. A prereformer generally employs a different type of catalyst than a primary reformer, for example a high activity, high nickel content catalyst. Temperatures in a prereformer may be in the range of about 800° F. (400° C.) to about 1100° F. (600° C.). Heat to a prereformer may be provided from exhaust gases from a reformer or other source, but is characterized by the lack of direct heating by a combustion flame. A prereformer and a reformer may be physically connected.

The step of forming the reformer feed gas mixture may comprise forming a first gas mixture from the separate steam-containing recycle gas mixture and the sulfur-depleted reformer feedstock, combining the first gas mixture with the steam-containing gas to form a sulfur-depleted feedstock mixture containing recycle gas, and introducing the sulfur-depleted feedstock mixture containing recycle gas into a prereformer to prereform the sulfur-depleted feedstock mixture containing recycle gas for forming the reformer feed gas mixture. Referring to the FIGURE, separate steam-containing recycle gas mixture 41 as stream 44 is combined with sulfur-depleted reformer feedstock 25 to form a first gas mixture. The first gas mixture is combined with steam-containing gas 31 to form sulfur-depleted feedstock mixture containing recycle gas 83. Sulfur-depleted feedstock mixture containing recycle gas 83 is introduced into prereformer 8 thereby forming a prereformed gas mixture containing recycle gas which is used for forming the reformer feed gas mixture 11. The prereformed gas mixture containing recycle gas may be optionally further heated in a heat exchanger (not shown) to form reformer feed gas mixture 11. The separate steam-containing recycle gas mixture and the sulfur-depleted reformer feedstock may be combined in a compressor ejector.

The step of forming the reformer feed gas mixture may comprise forming a steam-enriched recycle gas mixture from the separate steam-containing recycle gas mixture and the steam-containing gas, combining the steam-enriched recycle gas mixture with the sulfur-depleted reformer feedstock to form a sulfur-depleted feedstock mixture containing recycle gas, and introducing the sulfur-depleted feedstock mixture containing recycle gas into a prereformer to prereform the sulfur-depleted feedstock mixture containing recycle gas for forming the reformer feed gas mixture Referring to the FIGURE, steam-containing gas 31 is combined with separate steam-containing recycle gas mixture 41 as stream 45 to form a steam-enriched recycle gas mixture. The separate steam-containing recycle gas mixture and the steam-containing gas may be combined in a compressor ejector (not shown). The steam-enriched recycle gas mixture is combined with sulfur-depleted reformer feedstock 25 to form sulfur-depleted feedstock mixture containing recycle gas 83. Sulfur-depleted feedstock mixture containing recycle gas 83 is introduced into optional prereformer 8 thereby forming a prereformed gas mixture containing recycle gas which is used for forming the reformer feed gas mixture 11. The prereformed gas mixture containing recycle gas may be optionally further heated in a heat exchanger (not shown) to form reformer feed gas mixture 11.

The step of forming the reformer feed gas mixture may comprise forming a sulfur-depleted feedstock mixture from the sulfur-depleted reformer feedstock and the steam-containing gas, combining the sulfur-depleted feedstock mixture with the separate steam-containing recycle gas mixture to form a sulfur-depleted feedstock mixture containing recycle gas, and introducing the sulfur-depleted feedstock mixture containing recycle gas into a prereformer to prereform the sulfur-depleted feedstock mixture containing recycle gas for forming the reformer feed gas mixture. Referring to the FIGURE, sulfur-depleted reformer feedstock 25 and steam-containing gas 31 is combined to form a sulfur-depleted feedstock mixture. The sulfur-depleted feedstock mixture is combined with the separate steam-containing recycle gas mixture 41 as stream 46 to form a sulfur-depleted feedstock mixture containing recycle gas 83. The separate steam-containing recycle gas mixture may be combined with the sulfur-depleted feedstock mixture in a compressor ejector (not shown). Sulfur-depleted feedstock mixture containing recycle gas 83 is introduced into a prereformer 8 thereby forming a prereformed gas mixture containing recycle gas which is used for forming the reformer feed gas mixture 11. The prereformed gas mixture containing recycle gas may be optionally further heated in a heat exchanger (not shown) to form reformer feed gas mixture 11.

The reforming process is well-known. Equipment for performing the disclosed method can be designed and/or selected by those skilled in the art without undue experimentation. Those skilled in the art can use the disclosed method based on this disclosure without undue experimentation. Suitable operating parameters that have not been disclosed herein may be determined without undue experimentation.

The inventors have discovered that a catalytic steam reformer may be operated at a deep turndown (i.e. at less than 40% of the design hydrogen production capacity) using the disclosed method. Occasionally, a hydrogen production facility may be required to run at a rate below its design operating limits. Under turndown or deep turndown conditions, the flow distribution could become poor in the catalytic steam reformer on both the process side (feed flow to a large number of reformer tubes) and the furnace side (fuel and air flow to burners and flue gas flow through the furnace). Maldistribution of these flows translates into a maldistribution of temperature in the reformer, and therefore increase risk of overheating metal components in the reformer system. As the firing duty at deep turndown may go below its design operating minimum, difficulty with burner operation may occur. By maintaining the total flow to the reformer tubes through the use of the separate steam-containing recycle gas mixture, heat transfer to the tubes can be maintained thus avoiding local overheating of the tubes.

In addition to maldistribution and overheating in the reformer tubes, another issue with deep turndown is the limits on the flow control valves and flow meters to measure and control the flows below certain limits.

Computational simulations were performed to evaluate the disclosed method. In the simulations, steam-containing gas (process steam) is provided at 395° C. and 4.2 MPa. Sulfur-depleted reformer feedstock is provided at 347° C. and 4.2 MPa. The Examples are described with reference to the FIGURE.

EXAMPLE 1

In example 1, the reformer feed gas mixture is formed with a steam-containing gas and a sulfur-depleted hydrocarbon feed without a separate steam-containing recycle gas mixture. No prereformer was used in this example. Heat exchanger 4 and heat exchanger 5 were used to heat hydrocarbon feed and liquid water-containing feed, respectively. The reformer feed gas mixture was heated to 367 Celsius and had a pressure of 3.6 MPa prior to introducing into the reformer 1. The rate of hydrogen produced by the reformer was set to 15% less than its design production rate, i.e. the reformer was turned down. The resulting steam production in heat exchanger 3 was 85% of the steam production at full capacity. The net energy consumption per unit hydrogen produced at this reduced rate was 0.51% greater than at full production capacity. The net energy consumption rate is defined as the total energy consumption rate (feed, fuel and power) minus the energy rate of the export steam. The net energy consumption per unit hydrogen produced is defined as the net energy consumption rate divided by the hydrogen production rate.

EXAMPLE 2

In example 2, the reformer feed gas mixture is formed with a steam-containing gas, a sulfur-depleted hydrocarbon feed, and a separate steam-containing recycle gas mixture. No prereformer was used in this example. The sulfur-depleted hydrocarbon feed 25 was first combined with the steam-containing gas 31 to form a sulfur-depleted hydrocarbon mixture 82. The sulfur-depleted hydrocarbon mixture was then combined with the separate steam-containing recycle gas 47 to form the reformer feed gas mixture 86. To form the separate steam-containing recycle gas mixture, a first portion of the syngas stream 95 was removed at 399 Celsius and 3.3 MPa, cooled to 200 Celsius, compressed to 3.7 MPa, and heated back to 365 Celsius. The heat in the remaining portion of the syngas was recovered by heating the hydrocarbon feed, the liquid water-containing feed, the hydrocarbon feed and the liquid water-containing feed, respectively, in the heat exchanger 4, the heat exchanger 5, the heat exchanger 6 and the exchanger 7. The reformer feed gas mixture 86 was introduced to the catalytic steam reformer at 368 Celsius and 3.6 MPa. The rate of hydrogen produced by the reformer was set to 15% less than its design production rate. An amount of separate steam-containing recycle gas mixture was introduced to make the total volumetric flow in the reformer 1 equivalent to the volumetric flow in the reformer at full capacity. The net energy consumption per unit hydrogen produced was improved to only 0.1% greater than that at the design rate, and the steam production was increased to 90% of that at the design capacity.

About half of the improvement in the net energy consumption per unit hydrogen produced was due to enhanced heat recovery in the heat exchanger 5 and the heat exchanger 7. The other half was due to reducing the usage of the steam-containing stream 31 by 5%. This reduction is possible because the steam-containing recycle gas mixture brings back a large amount of steam to the reformer feed.

The invention claimed is:

1. A method for generating hydrogen in a production facility comprising:
   (a) forming a reformer feed gas mixture from a steam-containing gas, a sulfur-depleted reformer feedstock, and a separate steam-containing recycle gas mixture;
   (b) introducing the reformer feed gas mixture into a plurality of catalyst-containing reformer tubes of a catalytic steam reformer to form a reformed gas mixture comprising hydrogen;
   (c) combusting a fuel external to the plurality of catalyst-containing reformer tubes to supply energy for reforming the reformer feed gas mixture;
   (d) passing the reformed gas mixture or a portion of the reformed gas mixture from the plurality of catalyst-containing reformer tubes into a boiler to form a boiler effluent from the reformed gas mixture or the portion of the reformed gas mixture and to generate steam from a liquid water-containing feed; and
   (e) forming the separate steam-containing recycle gas mixture from a first portion of the boiler effluent, the separate steam-containing recycle gas mixture containing steam from the reformer effluent.

2. The method of claim 1 wherein the steam-containing gas comprises greater than 99 volume % steam.

3. The method of claim 1 wherein the sulfur-depleted reformer feedstock comprises less than 1 volume % steam.

4. The method of claim 1 wherein the separate steam-containing recycle gas mixture comprises greater than 10 volume % steam.

5. The method of claim 1 wherein the separate steam-containing recycle gas mixture comprises between 25 volume % and 95 volume % steam.

6. The method of claim 1 wherein the step of forming the separate steam-containing recycle gas mixture comprises:
   cooling the first portion of the boiler effluent to form a cooled portion of the boiler effluent; and
   compressing the cooled portion of the boiler effluent to form a compressed portion of the boiler effluent for forming the separate steam-containing recycle gas mixture.

7. The method of claim 6 wherein the step of forming the separate steam-containing recycle gas mixture further comprises:
   heating the compressed portion of the boiler effluent for forming the separate steam-containing recycle gas mixture.

8. The method of claim 1 further comprising:
   passing a second portion of the boiler effluent into at least one heat exchanger to heat at least one of a reformer feedstock and the liquid water-containing feed.

9. The method of claim 8 further comprising:
   passing the reformer feedstock into a desulfurization unit to form the sulfur-depleted reformer feedstock from the reformer feedstock.

10. The method of claim 1 wherein the step of forming the reformer feed gas mixture comprises:
    forming a first gas mixture from the separate steam-containing recycle gas mixture and the sulfur-depleted reformer feedstock; and
    combining the first gas mixture with the steam-containing gas.

11. The method of claim 1 wherein the step of forming the reformer feed gas mixture comprises:

forming a steam-enriched recycle gas mixture from the separate steam-containing recycle gas mixture and the steam-containing gas; and combining the steam-enriched recycle gas mixture with the sulfur-depleted reformer feedstock.

12. The method of claim 11 wherein the step of forming a steam-enriched recycle gas mixture comprises:

combining the separate steam-containing recycle gas mixture and the steam-containing gas in a compressor ejector.

13. The method of claim 1 wherein the step of forming the reformer feed gas mixture comprises:

forming a sulfur-depleted feedstock mixture from the sulfur-depleted reformer feedstock and the steam-containing gas; and combining the sulfur-depleted feedstock mixture with the separate steam-containing recycle gas mixture.

14. The method of claim 1 wherein the step of forming the reformer feed gas mixture comprises:

forming a sulfur-depleted feedstock mixture from the sulfur-depleted reformer feedstock and the steam-containing gas;

introducing the sulfur-depleted feedstock mixture into a prereformer to form a prereformed gas mixture; and combining the prereformed gas mixture with the separate steam-containing recycle gas mixture.

15. The method of claim 1 wherein the step of forming the reformer feed gas mixture comprises:

forming a steam-enriched recycle gas mixture from the separate steam-containing recycle gas mixture and the steam-containing gas;

combining the steam-enriched recycle gas mixture with the sulfur-depleted reformer feedstock to form a sulfur-depleted feedstock mixture containing recycle gas; and introducing the sulfur-depleted feedstock mixture containing recycle gas into a prereformer to prereform the sulfur-depleted feedstock mixture containing recycle gas for forming the reformer feed gas mixture.

16. The method of claim 1 wherein the step of forming the reformer feed gas mixture comprises:

forming a sulfur-depleted feedstock mixture from the sulfur-depleted reformer feedstock and the steam-containing gas;

combining the sulfur-depleted feedstock mixture with the separate steam-containing recycle gas mixture to form a sulfur-depleted feedstock mixture containing recycle gas; and introducing the sulfur-depleted feedstock mixture containing recycle gas into a prereformer to prereform the sulfur-depleted feedstock mixture containing recycle gas for forming the reformer feed gas mixture.

17. The method of claim 1 wherein the step of forming the reformer feed gas mixture comprises:

forming a sulfur-depleted feedstock mixture from the sulfur-depleted reformer feedstock and the steam-containing gas;

combining the sulfur-depleted feedstock mixture with the separate steam-containing recycle gas mixture in a compressor ejector to form a sulfur-depleted feedstock mixture containing recycle gas; and introducing the sulfur-depleted feedstock mixture containing recycle gas into a prereformer to prereform the sulfur-depleted feedstock mixture containing recycle gas for forming the reformer feed gas mixture.

18. The method of claim 1 wherein the step of forming the separate steam-containing recycle gas mixture comprises:

passing the boiler effluent into a shift reactor to form a shift reactor effluent; and taking a first portion of the shift reactor effluent for forming the separate steam-containing recycle gas mixture.

19. The method of claim 18 wherein the step of forming the separate steam-containing recycle gas mixture further comprises:

cooling the first portion of the shift reactor effluent to form a cooled portion of the shift reactor effluent; and compressing the cooled portion of the shift reactor effluent for forming the separate steam-containing recycle gas mixture.

20. The method of claim 18 further comprising:

passing a second portion of the shift reactor effluent into at least one heat exchanger to heat at least one of a reformer feedstock and the liquid water-containing feed.

21. The method of claim 1 wherein the step of forming the separate steam-containing recycle gas mixture comprises:

passing the boiler effluent into at least one heat exchanger to form a heat exchanger effluent and to heat at least one of a reformer feedstock and the liquid water-containing feed; and taking a portion of the heat exchanger effluent for forming the separate steam-containing recycle gas mixture.

22. The method of claim 21 wherein the step of forming the separate steam-containing recycle gas mixture further comprises:

cooling the portion of the heat exchanger effluent to form a cooled portion of the heat exchanger effluent; and compressing the cooled portion of the heat exchanger effluent for forming the separate steam-containing recycle gas mixture.

23. The method of claim 1 wherein the step of forming the separate steam-containing recycle gas mixture comprises:

passing the boiler effluent into a shift reactor to form a shift reactor effluent;

passing at least a portion of the shift reactor effluent into at least one heat exchanger to form a heat exchanger effluent and to heat at least one of a reformer feedstock and the liquid water-containing feed; and taking a portion of the heat exchanger effluent for forming the separate steam-containing recycle gas mixture.

24. The method of claim 23 wherein the step of forming the separate steam-containing recycle gas mixture further comprises:

cooling the portion of the heat exchanger effluent to form a cooled portion of the heat exchanger effluent; and compressing the cooled portion of the heat exchanger effluent for forming the separate steam-containing recycle gas mixture.

* * * * *